United States Patent
Mirbach (10) Patent No.: US 6,642,684 B1
(45) Date of Patent: Nov. 4, 2003

(54) SYSTEM AND METHOD FOR CONTROLLING A POSITIONING DEVICE, IN PARTICULAR FOR A DEVICE PERTAINING TO A TOOL MACHINE, AND A PHASE BLENDING DEVICE

(75) Inventor: Hermann Mirbach, Wegberg (DE)

(73) Assignee: DS Technologie Werkzeugmaschinenbau GmbH (DE)

( * ) Notice: Subject to any disclaimer, the term of this patent is extended or adjusted under 35 U.S.C. 154(b) by 0 days.

(21) Appl. No.: 10/111,348
(22) PCT Filed: Oct. 19, 2000
(86) PCT No.: PCT/EP00/10274
§ 371 (c)(1),
(2), (4) Date: Aug. 5, 2002
(87) PCT Pub. No.: WO00/31409
PCT Pub. Date: May 3, 2001

(30) Foreign Application Priority Data

Oct. 22, 1999 (DE) .......................... 199 50 902

(51) Int. Cl.$^7$ .............................. G05B 11/01
(52) U.S. Cl. ................. 318/560; 318/569; 318/567
(58) Field of Search ................. 318/560, 569, 318/567, 568.22; 250/231.16; 356/374

(56) References Cited

U.S. PATENT DOCUMENTS 4,368,469 A * 1/1983 Ott et al. ................. 342/352
5,375,066 A 12/1994 Yee et al.
5,414,516 A 5/1995 Morishita et al.

FOREIGN PATENT DOCUMENTS

| DE | 3201005 | 7/1983 |
| DE | 3513343 | 10/1986 |
| EP | 0652419 | 5/1995 |
| GB | 2335987 | 10/1999 |
| WO | 9800921 | 1/1998 |

* cited by examiner

Primary Examiner—Karen Masih
(74) Attorney, Agent, or Firm—Ostrolenk, Faber, Gerb & Soffen, LLP (57) ABSTRACT

System for controlling a positioning device, in particular actuators pertaining to machine tools, with an incremental position measuring device with output signals of the form $\sin \phi_1$, $\sin(\phi_1 \pm p)$ and a control unit converting the output signals into control signals and consequently controlling a positioning device, [lacuna] that means for mixing a correction angle $\phi_2$ into the output signals are provided and connected between the position measuring device and the control unit in such a way that the output signals obtain the forms $\sin(\phi_1 \pm \phi_2)$, $\sin(\phi_1 \pm \phi_2 \pm p)$ before they are converted, into control signals by the control unit.

17 Claims, 8 Drawing Sheets

Correction angle $\varphi 2$

SYSTEM AND METHOD FOR CONTROLLING A POSITIONING DEVICE, IN PARTICULAR FOR A DEVICE PERTAINING TO A TOOL MACHINE, AND A PHASE BLENDING DEVICE

TECHNICAL FIELD OF THE INVENTION

The invention relates to a system and a method for controlling a positioning device, in particular actuators pertaining to machine tools, with an incremental position measuring device with output signals of the form $\sin \phi_1$, $\sin (\phi_1+p)$ and a control unit converting the output signals into control signals and consequently controlling the positioning device. In this case, p is an angle by which the two output signals are phase-shifted.

The invention also relates to the use of a device, which can be used with said system or when carrying out said method, as a phase mixing device.

BACKGROUND OF THE INVENTION

In the case of machine tools, processing machines and production machines, but also in the case of various measuring and testing devices, it is necessary to position a tool or a measuring sensor automatically in relation to a workpiece or a part to be tested. For reasons of simplicity, the invention is always described below with reference to the example of positioning a tool of a machine tool in relation to a workpiece, without however restricting the invention to this specific application.

For the positioning of tool and workpiece, the tools on modern machine tools can generally be moved and swiveled or rotated about five or more axes. The moving and swiveling or rotating movements are controlled by a central control unit, generally what is known as numerical control (NC), the control unit continually receiving information from a position measuring device about the positional changes made during the moving, swiveling or rotating.

Among the position measuring devices, what are known as incremental (counting) position measuring devices have proven successful in particular. Depending on the type of output signals, a distinction is drawn here between measuring devices with rectangular (and consequently quasi digitized) output signals (the signals generally being transmitted in the form of a voltage pulse) and those with sinusoidal (that is analog) output signals. The devices with rectangular output signals are distinguished by relatively simple signal processing, the positional deviations generally amounting to ±3% of the signal period.

If traversing rates of at least 0.01 m/min are to be realized with a relatively short sampling time of, for example, 250 µs, and if, for reasons of accuracy, a change of at least one measuring step per sampling cycle is to take place, a measuring step of only 0.04 µm is required. With this measuring step, at 60 m/min for example, a step frequency of 60 m/(60s*0.04 µm)=25 MHz is obtained. To keep down the complexity of the circuitry in the downstream electronics, input frequencies of less than 1 MHz are desirable. For such high traversing rates and very small measuring steps, incremental position measuring devices with sinusoidal output signals have proven to be highly successful, a, relative positional deviation within a signal period for drives with digital speed control of less than 1% of the respective signal period of the measuring device making said devices even more accurate than measuring devices with rectangular output signals.

However, there is the problem that, on account of. Nonlinearities, thermal expansions, vibrations etc., the workpiece and tool are in fact in a position in relation to each other which deviates from the position which the control unit has calculated on the basis of the signals transmitted to it by the measuring device. Although such deviations are often only very small, in cases in which extremely small production tolerances are prescribed for the machining of a workpiece they can lead to the complete workpiece becoming unusable. In this case, the deviations occurring under certain conditions and/or in certain positions can often be calculated or measured in advance.

DE 32 01 005 C2 discloses a system for controlling a positioning device, in particular actuators pertaining to machine tools, which comprises an incremental position measuring device with output signals of the form $\sin \phi_1$, $\sin (\phi_1 \pm p)$, p being an angle by which the two output signals are phase-shifted, a control unit converting the output signals into control signals and consequently controlling a positioning device, and means for mixing a correction angle $\phi_2$ into the output signals, the means being connected between the position measuring device and the control unit in such a way that the output signals obtain the form $\sin (\phi_1 \pm \phi_2)$, $\sin (\phi_1 \pm \phi_2 \pm p)$ before they are converted n control signals by the control unit.

However, this system does not allow arbitrary correction angles to be taken into account and consequently cannot be used for controlling the positioning device.

DE 32 01 005 C2 stipulates that it is absolutely necessary to provide correction tracks alongside a scale, which have to be scanned for the acquisition of correction signals. According to the teaching of this document, it is consequently always absolutely necessary, for at least two "scales" to be scanned, that is to say firstly the actual scale and the associated correction track. The correction angles are consequently not arbitrary, but result exclusively from the scanned values of the correction track.

GB 2 335 987 A1 discloses a method for calibrating and compensating errors which are in the measuring system itself. The aim here is to eliminate "short range errors", in also being possible for these errors to be "phase errors", which have to be initially determined by means of FFT analysis and then used for correction. However, a machine in the sense of the present application cannot be controlled by calibrating or compensating the errors.

WO 98/00921 discloses an angle encoder for throttle valves. In the evaluation unit belonging to the encoder, the angle of the encoder is determined by mixing and multiplying harmonics of the excitation signal fed in. However, this evaluation unit is not a phase mixer in the sense of the present application.

The document U.S. Pat. No. 5,414,516 discloses a method for the high-resolving evaluation of the angle of two sinusoidal measuring signals, which are respectively offset by 90°. This document does not teach the active control of a positioning device by mixing in a correction angle.

The document EP 0 652 419 A1 discloses a method for the compensation of phase errors in measuring systems, it being possible to take into account angle errors determined in advance or else online, independently of the angle of the measuring system determined at the particular time, in the further processing by angle addition. However, the method does not allow arbitrary angles to be mixed into the measuring system. Rather, only errors within a graduation period are corrected here.

The document U.S. Pat. No. 5,375,066 discloses an apparatus for mixing in correction angles, which can be used only in the case of digital measuring systems or measuring systems with TTL level and not in the case of analog, sinusoidal measuring system signals which are phase-shifted.

SUMMARY OF THE INVENTION

Against this background, the invention is based on the object of specifying a device and a method for controlling a positioning device in which certain positional deviations can be automatically taken into account, without changes having to be made to the control units which, in themselves, have proven successful, or their mode of operation. In particular, it is intended that arbitrary correction angles can be taken into account, so that they can theoretically also be used for controlling the positioning device.

The object is achieved by a system for controlling a positioning device, in particular actuators pertaining to machine tools, with an incremental position measuring device with output signals of the form sine, $\sin(\phi_1 \pm p)$, p being an angle by which the two output signals are phase-shifted, a control unit converting the output signals into control signals and consequently controlling a positioning device, and means for mixing a correction angle $\phi_2$ into the output signals, the means being connected between the position measuring device and the control unit in such a way that the output signals obtain the form $\sin(\phi_1 \pm \phi_2)$, $\sin(\phi_1 \pm \phi_2 \pm p)$ before they are converted into control signals by the control unit, the system being characterized in that the means for mixing in a correction angle can access at least one freely programmable correction angle table with values of the correction angles $\phi_2$ to be taken into account for specific states x, or their trigonometric equivalents.

The invention is consequently based on the basic idea of "intercepting" the position signals supplied by the respective position measuring device on their way to the control unit, changing them in accordance with prescribed criteria and passing the changed position signals to the control unit, in order in this way to correct deviations between the measured position and the actual position of the tool or the like to be controlled. The correction angle $\phi_2$ to be mixed in here may—depending on the type of position device to be controlled and depending on the respective special conditions—even be far greater than $2\pi$ or than 360°, so that not only deviations within a step interval but also deviations of any magnitude can be corrected by the correction angle. Consequently, the correction angle can theoretically be used even for controlling the positioning device.

The correction angle itself may be determined in a wide variety of ways, some of them known, which are not the subject of this application. For example, the correction angle $\phi_2$ in out-of-round machining may be a function f(x, y) of the measured out-of-roundness of the surface to be machined. In the volumetric compensation, $\phi_2$ may be a function of one or more other functions, for example a function of the temperature, the axial expansion etc.

The invention has the great advantage that, on account of the fact that no interventions have to be made at all on the control unit itself, even finished machines can be retrofitted or converted to the new method of control without any problem.

In a preferred embodiment of the invention, the means for mixing in a correction angle $\phi_2$ comprise an analog phase mixer. This can access at least one, preferably two, freely programmable correction angle tables with values of the correction angles $\phi_2$ to be taken into account for specific states x, or their trigonometric equivalents, so that the correction angle $\phi_2$ is consequently not a constant value, but rather a function f(x) dependent on one or more parameters such as for example pressure, temperature, absolute position etc.—of the state x, that is $\phi_2 = f(x)$. Certain output signals of the position measuring device and certain intervals of $\phi_1$ may also be assigned certain correction angles $\phi_2$. For example, it may be envisaged to divide up the values of $\phi_1$ ranging from 0 to $2\pi$ or 0° to 360° into 1024 intervals and to assign a value $\phi_2$ to each interval.

In an advantageous development of the invention which is distinguished by particularly fast determination of the corrected values $\sin(\phi_1 \pm \phi_2)$, $\sin(\phi_1 \pm \phi_2 \pm p)$, to be passed to the control unit, the analog phase mixer has four multiplying A/D converters, one converter in each case being connected for: generating one of the following four values: $\sin \phi_1 * \cos \phi_2$, $\cos \phi_1 * \sin \phi_2$, $\sin(\phi_1 \pm p) * \cos(\phi_2$, $\cos(\phi_1 \pm p) * \sin \phi_2$. If the phase shift p between the output signals is precisely 90°, which is usually the case, $\sin(\phi_1 \pm p)$ corresponds precisely to $\cos \phi_1$ and the output signals consequently have the form $\sin \phi_1$, $\cos \phi_1$, so the converters can be wired for forming for automatically forming the values $\cos \phi_1 * \sin \phi_2$, $\sin \phi_1 * \sin \phi_2$, $\sin \phi_1 * \cos \phi_2$ and $\cos \phi_1 * \cos \phi_2$.

It has proven to be expedient if the analog phase mixer has two adding amplifiers, which respectively form, from the output values of two A/D converters in each case, one of the values $\sin(\phi_1 \pm \phi_2)$, $\sin(\phi_1 \pm \phi_2 \pm p)$. The adding amplifiers then advantageously allow the output signals that have been passed from the phase mixer to the control unit to be shaped, possibly by interposing a filter, in such a way that they correspond in their characteristic exactly to the output signals supplied by the position measuring device, to the reception of which the control unit is usually set and optimized.

Alternatively, it may also be provided that the means for mixing in the correction angle $\phi_2$ comprise at least one A/D converter for converting the analog output signals of the form $\sin \phi_1$, $\sin(\phi_1 \pm p)$ of the incremental position measuring device into digital signals and a digital computing unit for calculating the values $\sin(\phi_1 \pm \phi_2)$, $\sin(\phi_1 \pm p \pm \phi_2)$, the digital computing unit than being able in turn to access at least one, preferably two, freely programmable correction angle tables, in which the values of the correction angles $\phi_2$ to be taken into account for specific states x, or their trigonometric equivalents, in particular the values sing and $\sin(\phi_2 \pm p)$, are stored.

The stated object is also achieved by a method for controlling a positioning device, in particular actuators pertaining to machine tools, output signals of the form $\sin \phi_1$, $\sin(\phi_1 \pm p)$ being generated by an incremental position measuring device and passed to a control unit, which converts the output signals into the control signals controlling a positioning device, and correction angles $\phi_2$ being mixed in with the output signals before they are passed to the control unit, in such a way that the output signals obtain the form $\sin(\phi_1 \pm \phi_2)$, $\sin(\phi_1 \pm \phi_2 \pm p)$, the method being characterized in that the correction angles to be mixed in, or their trigonometric equivalents, are read out from at least one freely programmable correction angle table with values of the correction angles $\phi_2$ to be taken into account for specific states x, or their trigonometric equivalents.

In this case, the method may be carried out in such a way that the mixing-in of the correction angle $\phi_2$ is performed during the conversion of the analog output signals of the form $\sin \phi_1$, $\sin(\phi_1 \pm p)$ of the incremental position measuring device into digital signals, preferably using one or more multiplying A/D converters, this procedure ensuring signal processing which is particularly fast and also suitable for high input frequencies.

Alternatively, the method may, for example, be carried out in such a way that the mixing-in of the correction angle $\phi_2$ is performed after the conversion of the analog output signals of the form $\sin \phi_1$, $\sin (\phi_1 \pm p)$ of the incremental position measuring device into digital signals, preferably using a digital computing unit.

To realize the system and method according to the invention, a phase mixing device (hereafter referred to as phase mixer for short) for mixing a correction angle $\phi_2$ into the sinusoidal output signals $\sin \phi_1$, $\sin (\phi_1+p)$ of incremental position measuring devices is proposed, which comprises means for reading in the output signals $\sin \phi_1$, $\sin (\phi_1 \pm p)$ from the position measuring device, a memory device for storing at least one table with correction angles $\phi_2$ to be taken into account in the state x, or trigonometric equivalents of these angles, four multiplying A/D converters for forming terms to be taken into account according to the addition theorem for the sums of/differences between two angles, and also two adding amplifiers, each connected to two of the multiplying A/D converters, for forming the values $\sin (\phi_1 \pm \phi_2)$ and $\sin (\phi_1 \pm \phi_2 \pm p)$ from the values supplied by the multiplying A/D converters.

Alternatively, the phase mixing device may also be designed in such a way that it comprises means for reading in analog sinusoidal output signals $\sin \phi_1$, $\sin (\phi_1+p)$ of an incremental position measuring device, a memory device for storing at least one table with correction angles $\phi_2$ to be taken into account in the state x, or trigonometric equivalents of these angles, at least one A/D converter for converting the sinusoidal analog output signals into digital signals, and la digital computing unit for forming the values $\sin (\phi_1 \pm \phi_2)$ and $\sin (\phi \pm P\phi_1 \pm \phi_2)$ or $\cos (\phi_1 \pm \phi_2)$ from the digital signals supplied by the at least one A/D converter.

BRIEF DESCRIPTION OF THE DRAWINGS

Further details and advantages of the invention emerge from the following description of several exemplary embodiments in conjunction with the drawing, in which.

DETAILED DESCRIPTION OF THE PREFERRED EMBODIMENT(S)

Figure 1:
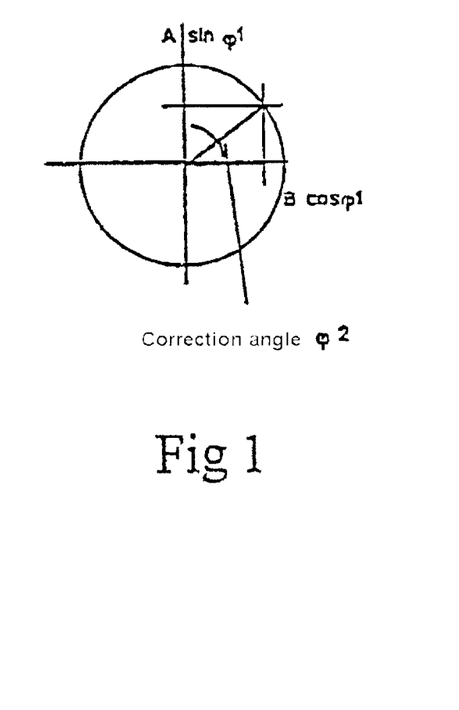
FIG. 1 shows a basic diagram for explaining the problem, that is the mixing of a correction angle $\phi_2$ into output signals of the form $\sin \phi_1$, $\cos \phi_1$ (in the case of a phase shift p of 90°)

In FIG. 1 it is schematically shown how the sinusoidal output signals supplied by a position measuring device known per se, and therefore not represented any further here, behave, the phase offset between the two output signals being exactly 90°, so that the one signal changes sinusoidally the other signal cosinusoidally. In the case of the known control systems, the position, for example of a tool on a machine tool, would thus be determined from the values $\sin \phi_1$ and $\cos \phi_1$. As stated above, there is the problem here that, for various reasons, the measured position does not coincide with the actual position.

Figure 2:
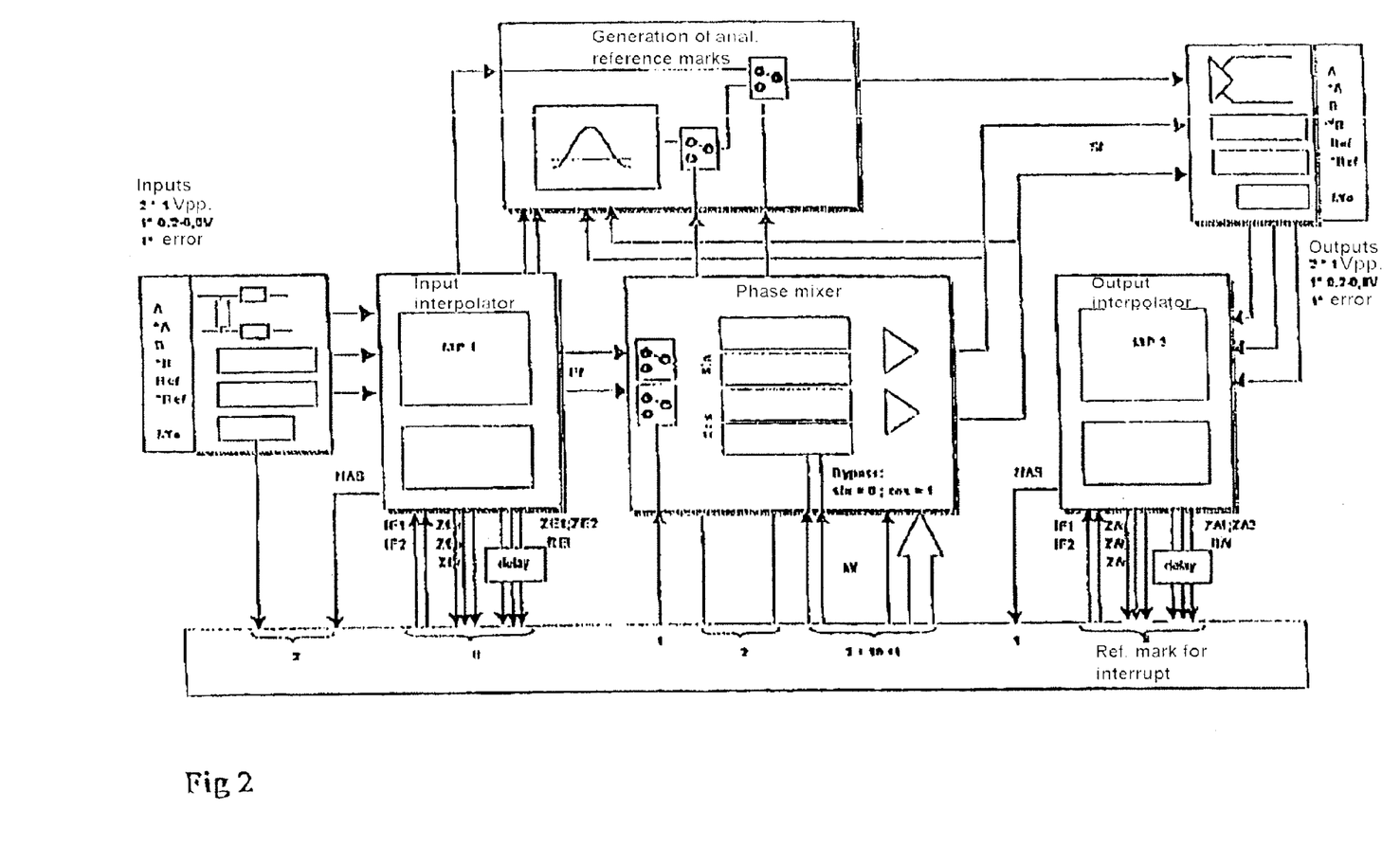
FIGS. 2 and 3 show a block diagram of a phase mixing gate with an analog phase mixer.
Figure 3:
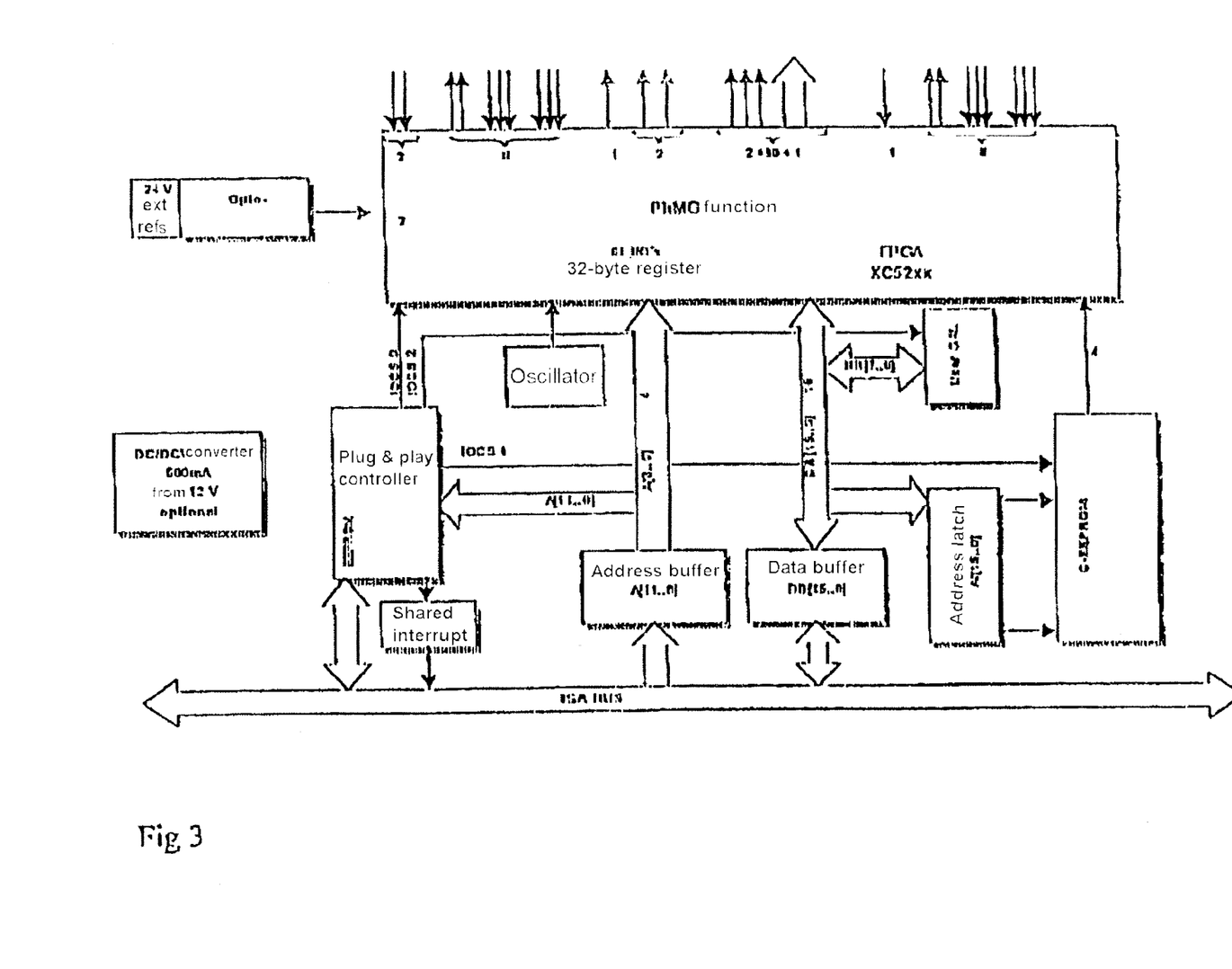

While, in the case of digital position measuring devices, correction values can be added to or subtracted from the measured values relatively easily when there are known errors, this is not readily possible in the case of the measuring systems with sinusoidal output signals, which in principle are more accurate. It is thus envisaged according to the invention to correct deviations by mixing a correction angle $\phi_2$ into the output signals, so that the values $\sin \phi_1$ and $\cos \phi_1$, used for a control unit for controlling a positioning device, change according to the addition theorem for the sum of or difference between two angles. FIGS. 2 and 3 show the block diagram of a phase mixing gate serving for the nontrivial mixing-in of such a correction angle $\phi_2$ with an analog phase mixer, FIG. 3 not continuing on the same scale as FIG. 2.

The phase mixing gate shown in FIGS. 2 and 3 is divided into the following regions:

input circuit for encoder, including error decoding and external 24 volt signal, it being optionally possible to provide that a nonisolated AC-DC converter, supplies the connected measuring system with voltage, analog phase mixer and analog reference signal formation, digitization of the sinusoidal input-output signals, output circuit as encoder simulation for downstream control systems, FPGA (Field Programmable Gate Array) with oscillator, the actual phase mixing gate functions being realized in this freely programmable hardware, plug & play controller, this module, as a link to the ISA BUS, supplying the address decoding of the phase mixing gate and the interrupt capability, and the phase mixing gate also being suitable, as a result of the P & P capability, for modern, future boards with new BIOS versions and operating systems, and the configuration lying in an internal EEPROM, data and address buffers for decoupling the card from the ISA BUS, a flash EPROM, which contains the bit map of the FPGA module and the content of which is, automatically transferred within a few milliseconds into the FPGA after switching on, whereupon the FPGA becomes operational.

In this case, the main function of the phase mixing gate shown is to "falsify" measuring system signals, that is to say to transmit to the downstream control system different positional information than that determined by the actual position measuring device, by mixing in a specifically selected number of displacement increments. This mixing operation can be used for a wide variety of machines and devices, in particular in what is known as volumetric compensation, out-of-round machining and temperature compensation.

Figure 10:
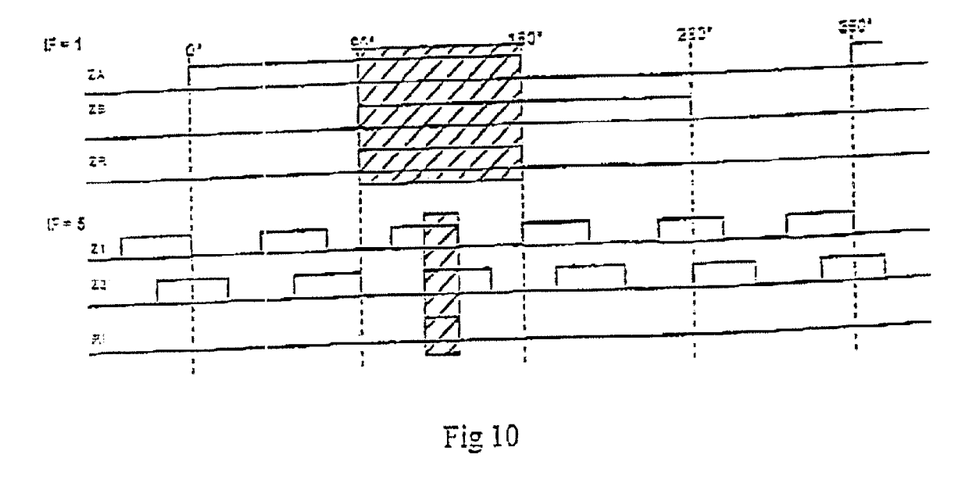
FIG. 10 shows a basic diagram for illustrating the typical signal waveform of the interpolated signal sequences and FIG. 11 shows a schematic representation of the basic principle in the generation of reference signals.
Figure 11:
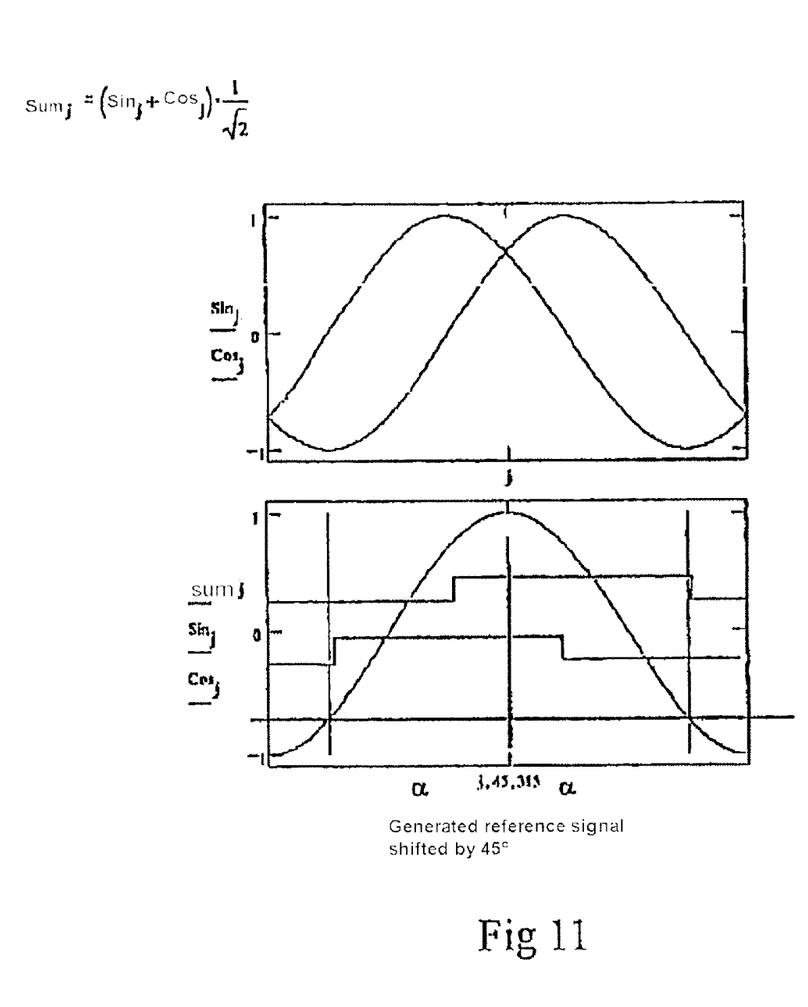

In the cases in which a measuring system has to be used without its own zero pulse, the phase mixing gate shown in FIGS. 2 and 3 is capable of generating a sinusoidal reference signal from the sine-cosine signals of the encoder, this operation being initiated by an external reference switch and being incorporated in the next-possible analog signal quantization (cf. FIG. 11). As shown in FIG. 10, the reference marks generated by the interpolator lie precisely in the quantization of the displacement signals, in conformity with the rules for digital measuring systems, this applying both to the signals for the divider ratio of 1 and to the signals with interpolated signal sequences.

Figure 4:
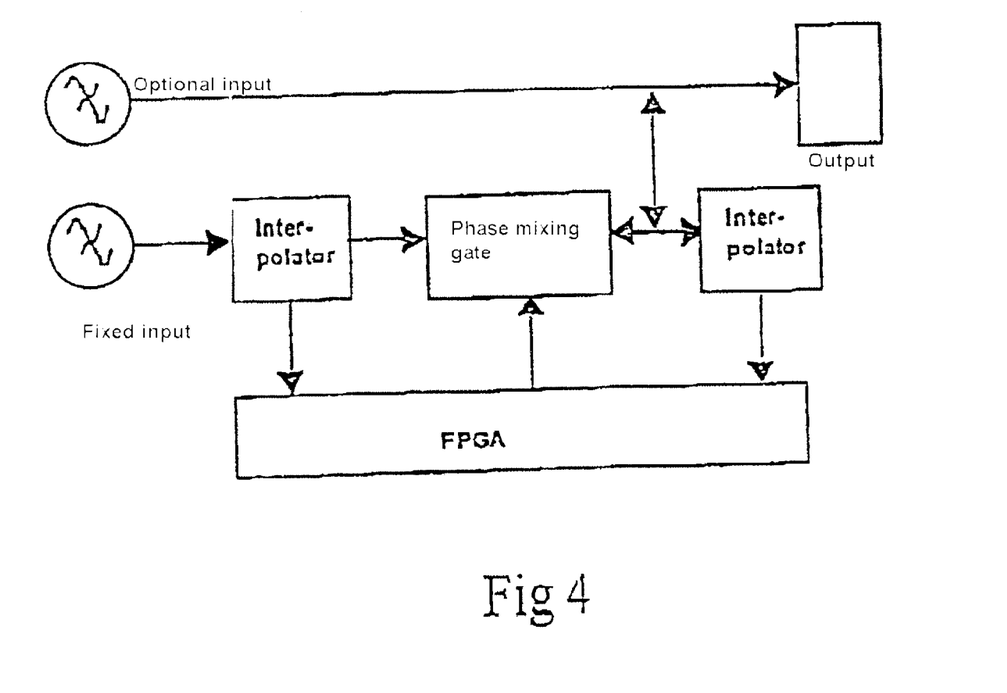
FIG. 4 shows a greatly simplified basic diagram of the integration of the analog phase mixer into an encoder interface.

FIG. 4 shows a basic diagram of an encoder interface, which comprises two encoder inputs with interpolators, one of which may be optionally used as a second encoder input. A simulated encoder output may pass on either the input signals of the optional input or the encoder signals generated in the phase mixing gate to the downstream control. With the second interpolator, the sum of the mixed signal and encoder input is acquired separately and fed to the FPGA.

The centerpiece of the system according to the invention is formed by an analog phase mixer, in which the analog signals of the position measuring device with the angle $\phi_1$ are shifted by an angle $\phi_2$ with a defined frequency, this taking place in the same way for both values $\sin \phi_1$ and $\sin (\phi_1+p)$. Since the phase shift p between the two signals is generally exactly 90°, the signal $\sin (\phi_1+p)$ corresponds to the value $\cos \phi_1$. The invention allows the angle $\phi_1$ to be increased or reduced, depending on the application, by a correction angle $\phi_2$. In the case of the circuit shown in FIG. 5, it has been assumed that the correction angle $\phi_2$ is to be subtracted from the value from the value $\phi_1$. Accordingly, the circuit must consequently convert the output signals $\sin \phi_1$, $\cos \phi_1$ of the position measuring device, which form the input signals of the phase mixer, automatically into the output signals $\sin (\phi_1-\phi_2)$ and $\cos (\phi_1-\phi_2)$ to be passed to the control unit not shown in any further detail here. This takes place via the relationships $\sin (\phi_1-\phi_2)=\sin \phi_1{}^*\cos \phi_2-\cos \phi_1{}^*\sin \phi_2$ and $\cos (\phi_1-\phi_2)=\cos \phi_1{}^*\cos \phi_2+\sin \phi_1{}^*\sin \phi_2$ In this case, the individual multiplication terms are generated in four stages. The input signals symmetrical to 0 V form the angle $\phi_1$. The angles $\phi_2$ of the mixing operation are generated by sine-cosine tables. These tables are activated via EPROMs from the FPGA and the "mixing frequency" generated therein. The resolution is, for example, 10 bits for a full circle. Four multiplying A/D converters form the individual stages of the individual results, which are then calculated by adding amplifiers. The circuit shown is fully static, so that intermediate results are advantageously retained.

Figure 5:
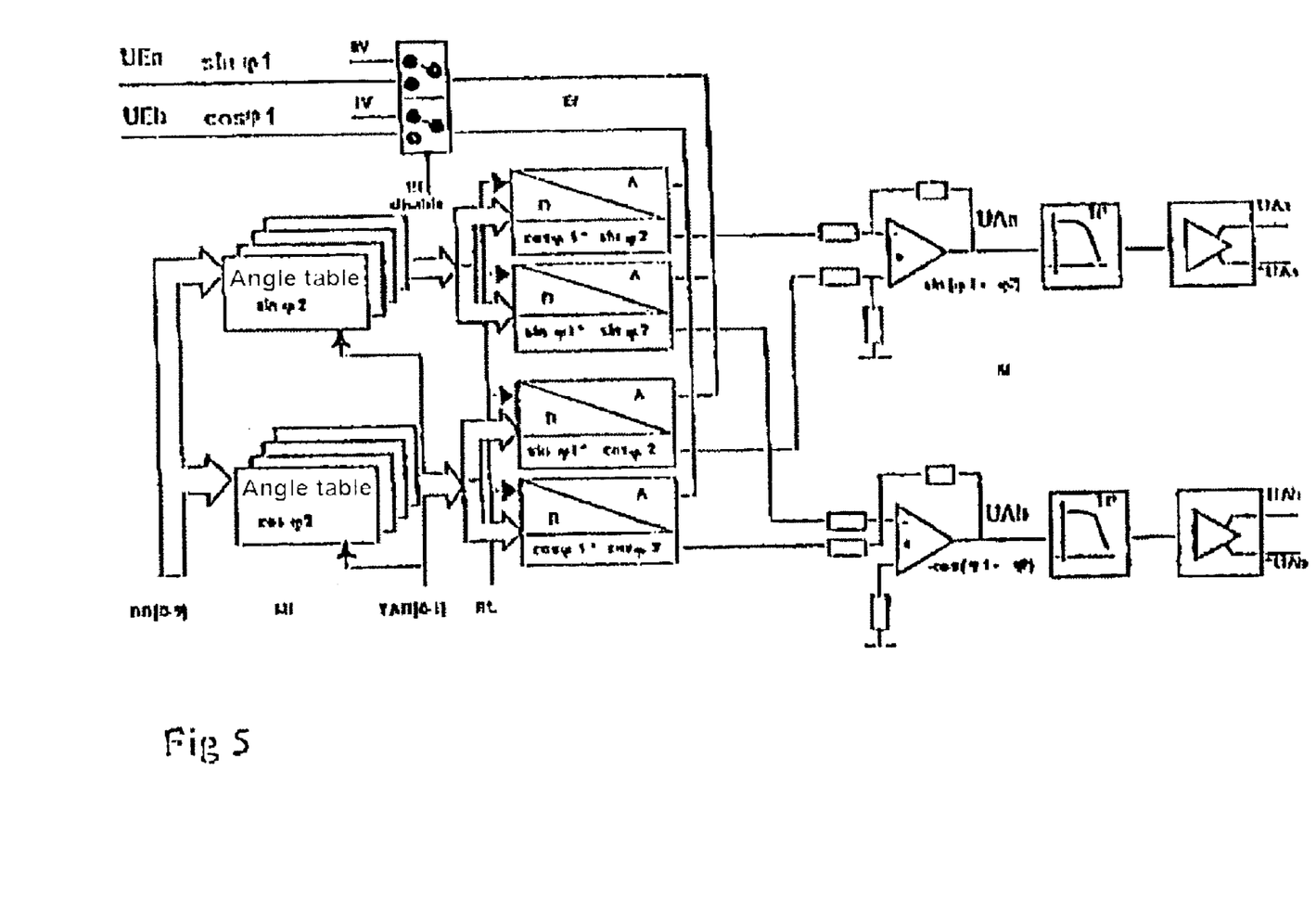
FIG. 5 shows a diagram of the analog phase mixer with four multiplying A/D converters and two adding amplifiers.
Figure 6:
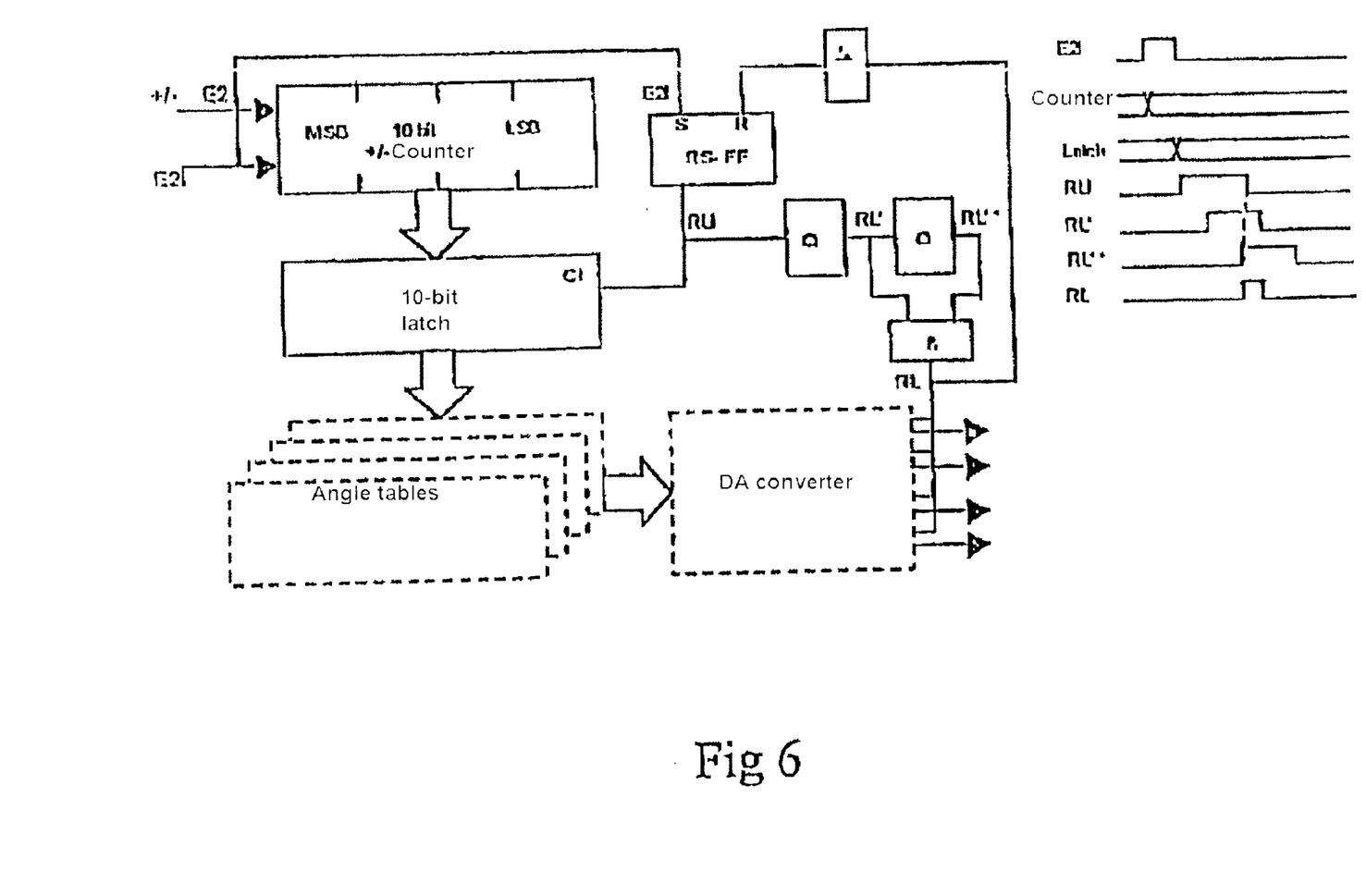
FIG. 6 shows a diagram of the activation of the phase mixer.

The activation of the phase mixer shown in FIG. 5 takes place as shown in FIG. 6. In this case, the pulses E2+/and E2i generated in the mixing angle generation are acquired in a bidirectional buffer counter of, in this exemplary embodiment, 10 bits. These 10 bits represent a circle with 1024 sub-angles, to each of which a value in the sine-cosine EPROM tables is assigned. Each new pulse E2i has the effect of triggering a sequence, with which the new angle value is transferred via the EPROM tables into the A/D converters. If it is wished to obtain various circle resolutions, so that it is also possible to work with high sampling frequencies, a plurality of tables can advantageously be realized in the circle resolutions of 10 bits ($=2\pi/1024$), 9 bits ($=2\pi/512$), 8 bits ($=2\pi/256$) and 7 bits ($2\pi/128$).

Figure 7:
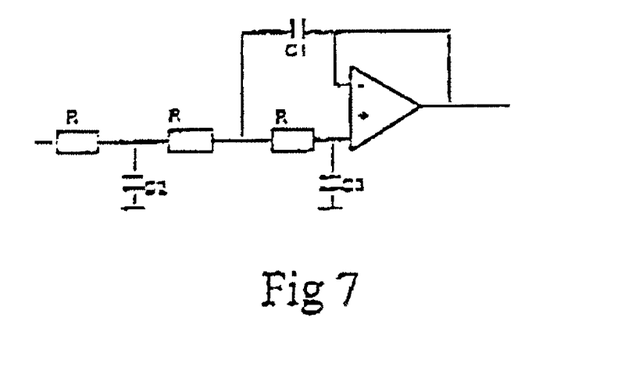
FIG. 7 shows a low-pass filter arranged downstream of the phase mixer, for limiting the maximum possible analog output frequency.

FIG. 7 shows a low-pass filter, to be precise a three-pole Bessel filter, with which it is advantageously possible to limit the maximum possible analog output frequencies of the phase mixer. The cutoff frequency is approximately 300 kHz.

Figure 8:
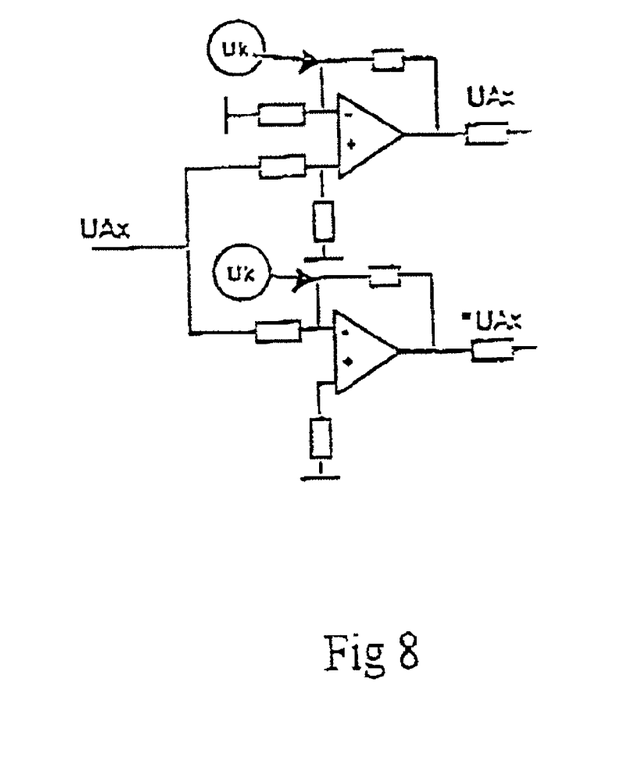
FIG. 8 shows a basic diagram of the output stage for amplifying the low-pass-filtered analog signal.

Shown in FIG. 8 is an output stage which amplifies, the analog signal from the internal processing stages of the phase mixer and has the inverted signal with the same signal specifications as the output signals of the position measuring device entering the phase mixer. The zero point of the analog signal levels is raised again to the normal level between 0 and 5 volts by a correction voltage, advantageously achieving the effect that the downstream control unit does not find any difference from a direct measuring signal output.

Figure 9:
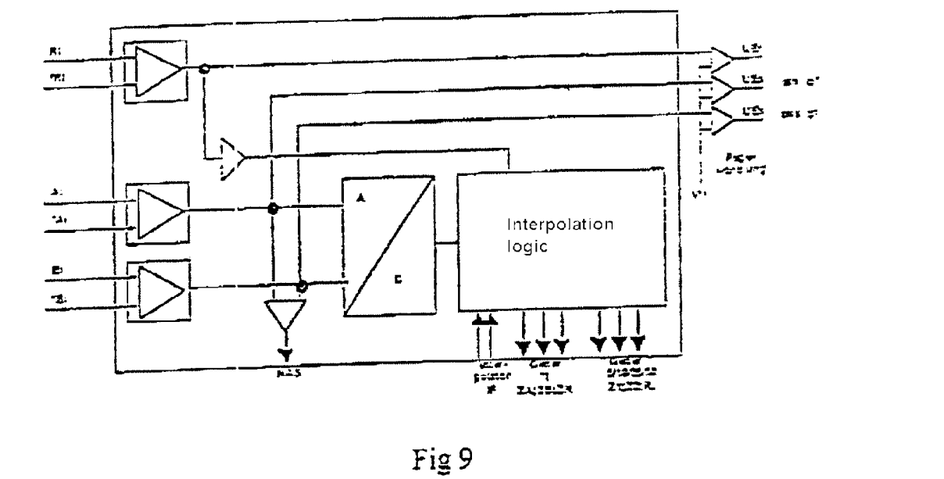
FIG. 9 shows a basic diagram of the encoder evaluation by means of MIP modules.

The evaluation of the analog measuring system signal takes place by means of interpolator modules, as shown in FIG. 9. In this case, the modules are capable of breaking down the circle formed by the sine and cosine signals into uniform angle segments, and thus of achieving a selectable multiplication of the encoder signals up to a factor of 50. The signals generated are available in a digital form and are Gray-coded, corresponding to a single-step code. The module supplies, in parallel to one another, the signals*1 and the interpolated signals selectable via two inputs.

Numerous modifications and developments, relating for example to the circuitry used for realizing the phase mixer, are possible within the scope of the idea of the invention. What is essential for the invention in any event is the mixing of a correction angle, correcting arbitrary errors and—if desired—also serving deliberately for targeting certain positions, into the position signals supplied by a position measuring device on their way to the control unit, the mixing-in preferably being performed by applying the addition theorems for the addition of two angles ($\sin (\phi_1\pm\phi_2)=\sin \phi_1{}^*\cos \phi_2\pm\cos \phi_1{}^*\sin \phi_2$, $\cos (\phi_1\pm\phi_2),=\cos \phi_1{}^*\cos \phi_2\pm\sin \phi_1{}^*\cos \phi_2$).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for controlling a positioning apparatus, comprising:
   a) an incremental position measuring device for providing analog output signals of the form $\sin \phi_1$, $\sin (\phi_1\pm p)$, p being an angle by which the two output signals are phase-shifted,
   b) a control unit for converting the output signals into control signals for controlling the positioning apparatus, and
   c) mixing means for mixing a correction angle $\phi_2$ into the output signals, the mixing means being connected between the incremental position measuring device and the control unit in such a way that the output signals obtain the form $\sin (\phi_1\pm\phi_2)$, $\sin (\phi_1\pm\phi_2\pm p)$ before they are converted into control signals by the control unit, the mixing means accessing at least one correction angle table in which values of the correction angles $\phi_2$ or their trigonometric equivalents to be taken into account for specific situations are stored.

2. The system as claimed in claim 1, wherein the correction table is programmable.

3. The system as claimed in claim 1, wherein the mixing means accesses two correction angle tables in which the values $\sin (\phi_2$ and $\sin (\phi_2\pm p)$ to be taken into account for specific situations are stored.

4. The system as claimed in claim 1 or 3, wherein the mixing means comprises an analog phase mixer.

5. The system as claimed in claim 4, wherein the analog phase mixer has four multiplying A/D converters for forming respectively one of the following four values: $\sin \phi_1 * \cos \phi_2$, $\cos \phi_1 * \sin \phi_2$, $\sin (\phi_1 \pm p) * \cos (\phi_2 \pm p)$ or $\cos (\phi_1 \pm p) * \sin (\phi_2 \pm p)$.

6. The system as claimed in claim 4, wherein the phase shift p between the output signals is 90°, the output signals have the form $\sin \phi_1$, $\cos \phi_1$, and the analog phase mixer has four multiplying A/D converters for forming respectively one of the values $\cos \phi_1 * \sin \phi_2$, $\sin \phi_1 * \sin \phi_2$, $\sin \phi_1 * \cos \phi_2$ and $\cos \phi_1 * \cos \phi_2$.

7. The system as claimed in claim 5, wherein the analog phase mixer has two adding amplifiers, which respectively form, from the output values of two of the A/D converters, one of the values $\sin (p\phi_1 \pm \phi_2)$, $\sin (\phi_1 \pm \phi_2 \pm p)$ or $\cos (\phi_1 \pm \phi_2)$.

8. The system as claimed in claim 6, wherein the analog phase mixer has two adding amplifiers, which respectively form, from the output values of two of the A/D converters, one of the values $\sin (\phi_1 \pm \phi_2)$, $\sin (\phi_1 \pm \phi_2 + p)$ or $\cos (\phi_1 \pm p \pm \phi_2)$.

9. The system as claimed in claim 1 or 3, wherein the mixing means comprises at least one A/D converter for converting the analog output signals of the form $\sin \phi_1$, $\sin (\phi_1 \pm p)$ of the incremental position measuring device into digital signals and a digital computing unit for calculating the values $\sin (\phi_1 \pm \phi_2)$ $\sin (\phi_1 \pm p \pm \phi_2)$.

10. A method for controlling a positioning apparatus, which comprises:
 a) generating analog output signals of the form $\sin \phi_1$, $\sin (\phi_1 \pm p)$ by an incremental position measuring device,
 b) passing the output signals to a control unit to convert the output signals into control signals for controlling the positioning apparatus, and
 c) mixing correction angles $\phi_2$ or their trigonometric equivalents in with the output signals before they are passed to the control unit in such a way that the output signals obtain the form $\sin ((\phi_1 \pm \phi_2))$, $\sin (\phi_1 \pm \phi_2 \pm p)$, wherein the correction angles to be mixed in, or their trigonometric equivalents, are read out from at least one correction angle table in which values of the correction angles $\phi_2$ or their trigonometric equivalents to be taken into account for specific situations are stored.

11. The method as claimed in claim 10, wherein the trigonometric equivalents of the correction angles to be mixed in are read out from two correction angle tables, in which the values $\sin \phi_2$ and $\sin (\phi_2 \pm p)$ to be taken into account for specific states are stored.

12. The method as claimed in claim 10 or 11, wherein the mixing-in of the correction angle $\phi_2$ is performed during the conversion of analog output signals of the form $\sin \phi_1$, $\sin (\phi_1 \pm p)$ of the incremental position measuring device into digital signals.

13. The method as claimed in claim 12, wherein the conversion of the analog output signals into digital signals is effected using one or more multiplying A/D converters.

14. The method as claimed in claim 10 or 11, wherein the mixing-in of the correction angle $\phi_2$ is performed after the conversion of analog output signals of the form $\sin \phi_1$, $\sin (\phi_1 \pm p)$ of the incremental position measuring device into digital signals.

15. The method as claimed in claim 14, wherein the conversion of the analog output signals into digital signals is effected using a digital computing unit.

16. A phase mixing device for mixing a correction angle $\phi_2$ into sinusoidal output signals $\sin \phi_1$, $\sin (\phi_1 + p)$ of an incremental position measuring device, comprising:
 a) means for reading in the output signals $\sin \phi_1$, $\sin (\phi_1 + p)$,
 b) a memory device for storing at least one table with correction angles $\sin \phi_2$ to be taken into account for a particular situation or trigonometric equivalents of these angles,
 c) four multiplying A/D converters for forming terms to be taken into account according to an addition theorem for the sum of two angles, and
 d) two adding amplifiers, each connected to two of the four multiplying A/D converters, for forming the values $\sin (\phi_1 \pm \phi_2)$ and $\sin (\phi_1 \pm \phi_2 \pm p)$ or $\cos (\phi_1 \pm \phi_2)$ from the values supplied by the multiplying A/D converters.

17. A phase mixing device for mixing a correction angle $\phi_2$ into analog sinusoidal output signals $\sin (\phi_1$, $\sin (\phi_1 + p)$ of an incremental position measuring device, comprising:
 a) means for reading in the analog output signals $\sin (\phi_1$, $\sin (\phi_1 + p)$,
 b) a memory device for storing at least one table with correction angles $\phi_2$ to be taken into account for a specific situation or trigonometric equivalents of these angles,
 c) at least one A/D converter for converting the sinusoidal analog output signals into digital signals, and
 d) a digital computing unit for forming the values $\sin (\phi_1 \pm \phi_2)$ and $\sin (\phi_1 \pm p \pm \phi_2)$ or $\cos (\phi_1 \pm \phi_2)$ from the digital signals supplied by the at least one A/D converter.

* * * * *